June 16, 1959 L. H. BROOKHOUSER 2,890,883
FLAME CUTTING TABLE
Filed April 3, 1956 2 Sheets-Sheet 1
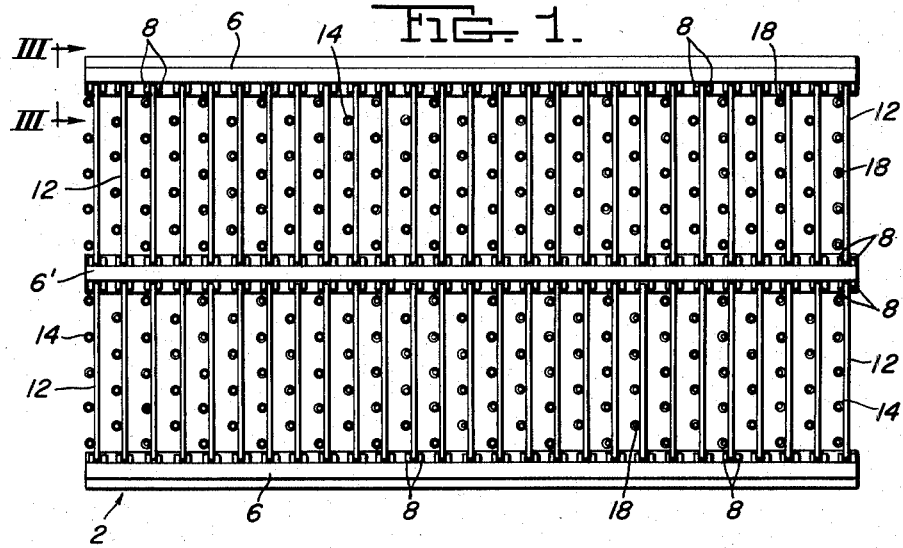
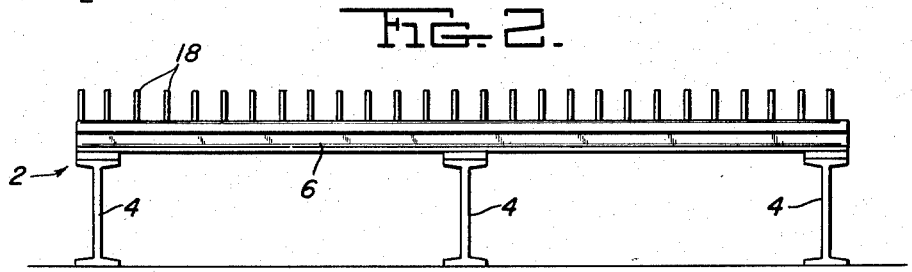
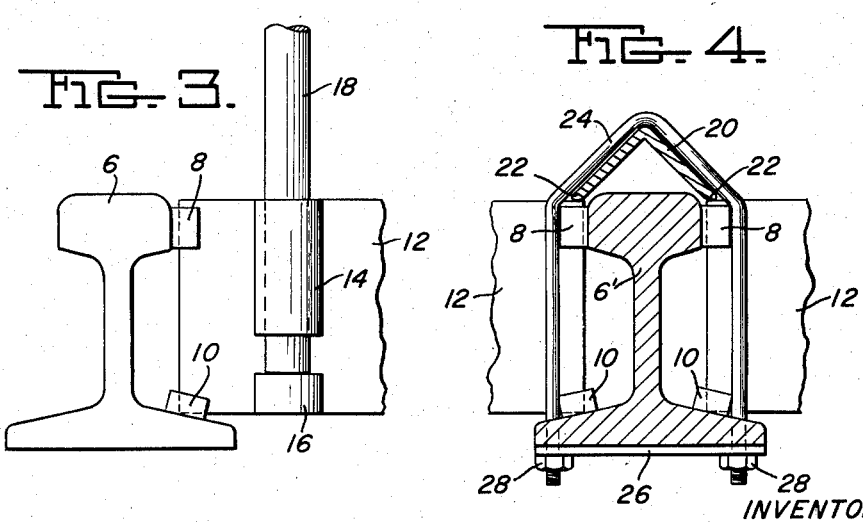
INVENTOR:
LAWRENCE H. BROOKHOUSER,
BY: Donald G. Dalton
his Attorney.

June 16, 1959 L. H. BROOKHOUSER 2,890,883
FLAME CUTTING TABLE
Filed April 3, 1956 2 Sheets-Sheet 2
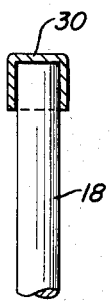
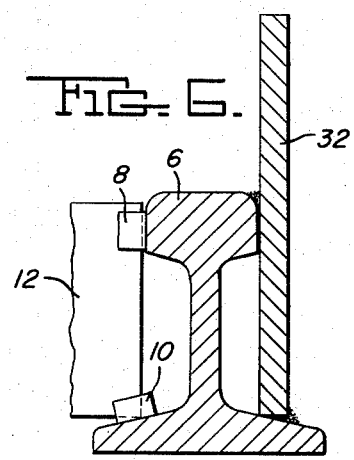
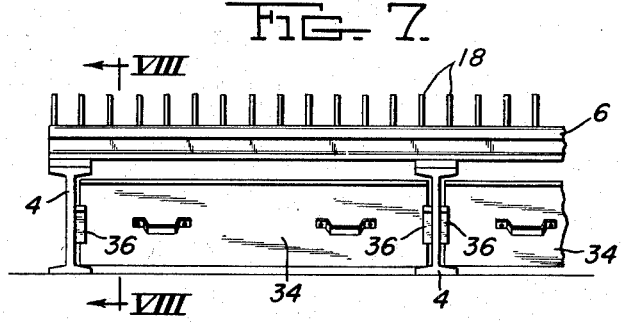
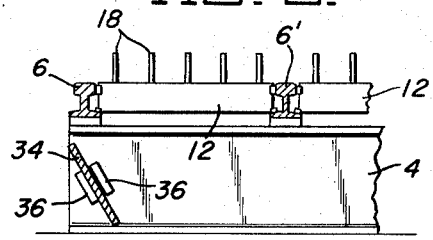
INVENTOR:
LAWRENCE H. BROOKHOUSER,
BY: Donald G. Dalton
his Attorney.

United States Patent Office 2,890,883
Patented June 16, 1959

2,890,883
FLAME CUTTING TABLE

Lawrence H. Brookhouser, McKeesport, Pa., assignor to United States Steel Corporation, a corporation of New Jersey Application April 3, 1956, Serial No. 575,789

1 Claim. (Cl. 269—163)

The present invention relates generally to flame cutting equipment and more particularly to an improved table for supporting workpieces for flame cutting.

Mill equipment made in the boiler shop of a modern industrial plant frequently includes structural fabrications or machine parts which do not require a finished surface. In many instances the production of such equipment involves flame cutting steel plates into various shapes. The flame cutting is done either with a manually manipulated torch or by means of a flame cutting machine. In both the manual and machine operation, a workpiece, usually in the form of a steel plate, is positioned on a horizontal supporting surface and then cut to the desired shape by applying an oxygen-acetylene cutting flame or series of flames to the workpiece along the outline of the shape desired. Whether the flame cutting is done manually or by a flame cutting machine, the workpiece must be supported firmly in a level plane while being cut. In flame cutting, the cutting flame oxidizes the metal of the workpiece along the line of cut and causes it to burn through. More often than not, each time a flame cut is made a portion of the supporting surface, which is usually a steel table, is burned to some degree. This is especially true where the workpiece being cut is of irregular shape.

It is accordingly an object of my invention to provide a flame cutting table of rugged construction having a horizontal supporting surface made up of a plurality of replaceable elements for firmly supporting a workpiece in a level plane.

It is another object of my invention to provide a flame cutting table having a raised supporting surface made up of a plurality of replaceable spaced vertical rods terminating in a common horizontal plane.

It is another object of my invention to provide a flame cutting table having an open-bottom supporting surface whereby accumulation of slag on the supporting surface during flame cutting is minimized.

It is another object of my invention to provide a flame cutting table made up of component parts assembled in such a manner that the table may be easily disassembled, wholly or in part, for cleaning and/or replacement of burned or worn components.

It is a further object of my invention to provide a flame cutting table having a multi-element supporting surface wherein the supporting surface elements are protected from the oxidizing effects of the cutting flame.

These and other objects will become more apparent after referring to the following specification and attached drawings, in which:

Figure 1 is a plane view;
Figure 2 is a side elevational view;
Figure 3 is an end view taken on the lines III—III of Figure 1;
Figure 4 is a cross-sectional view of a modification of the invention;
Figure 5 is an elevational view partly in section showing one of the rods of the table of the invention provided with a protective cap;
Figure 6 is a cross sectional view of another modification of the invention;
Figure 7 is a side elevational view showing the table of the invention provided with shielding plates; and
Figure 8 is a cross-sectional view taken on the lines VIII—VIII of Figure 7.

Referring more particularly to the drawings reference numeral 2 designates the base of the table of the invention which may be made up of spaced steel H-beams 4 disposed in parallel relation. The H-beams 4 support three spaced apart steel bars which are disposed in spaced parallel relation with their longitudinal axes extending normal to the axes of the H-beams 4. The two side bars are designated by reference numeral 6 and the center bar is designated by reference numeral 6'. A plurality of pairs of spaced lugs 8 are welded or otherwise fixedly mounted on the inner side of each of the bars 6 along their length adjacent to the tops thereof. The center bar 6' has the pairs of lugs 8 attached to both sides thereof as best shown in Figure 1. A pair of spaced lugs 10 is welded on the bottom of each of the bars 6 and 6' directly below and in alignment with each of the pairs of lugs 8. The space between the lugs 8 in each pair and the space between the lugs 10 of each pair form slots for slidably receiving and retaining an upright plate 12. I have found it convenient to use railroad rails as bars 6 and 6' with the lugs 8 being welded to the side of the rail head and the lugs 10 welded on the base of the rail. However, straight or other shape bars with cooperative plate retaining means could be utilized for this purpose.

A plurality of spaced hollow cylinders 14, which may be in the form of pipe sections, are welded in vertical disposition to one face of each of the plates 12. An abutment or projection 16 is welded to each of the plates 12 spaced below and aligned with the bore of each of the cylinders 14, as best shown in Figure 3. Each cylinder 14 and the abutment 16 therebelow serves as a socket for removably receiving the lower end of a vertically disposed steel rod 18. The upper ends of the rods 18 project upwardly of the plates 12 and terminate in a common horizontal plane to form the level supporting surface of the table.

The perforated supporting surface that is formed by the spaced rods 18 eliminates the concentration and reflection of burning heat which was prevalent in cutting tables used prior to my invention. Since a perforated supporting surface is formed by the spaced rods 18, undesirable accumulation of slag on the supporting surface is avoided. As the workpiece is flame cut, the slag formed falls to the floor through the openings between the rods 18 and between the plates 12. This slag may be easily removed after cooling by scraping the floor. At intervals it is necessary to remove one or more of the rods 18 due to burning by the cutting flame. This is easily done by merely lifting the rod from the cylinder 14 and replacing it with a new one. The slag formed around the rod as a result of the workpiece cut thereon does not interfere with removal of the rod. If the rod is slag encrusted it is tapped slightly at the top with a hammer or similar tool which readily loosens the rod so that it may be easily removed. I have shown alternate rows of four and five rods making up the table surface between the side bars 6 and center bar 6'. This arrangement makes it possible to handle a wide size range of workpieces. Where uniformly large workpieces are handled the rod spacing may be increased by decreasing the number of rods and where uniformly small size workpieces are handled the spacing between rods may be decreased by increasing the number of sockets and rods.

Frequently, vibrations set up by machinery in the vicinity of the cutting table cause vertical movement of the plates 12 in the retaining slots. The effects of such vibration may be minimized by installing an elongated angle bar 20 longitudinally astride of the center bar 6' extending along the length of the bar with the outer edges 22 of its leg portions resting on the tops of the plates adjacent each side of the bar 6'. The angle bar 20 may be secured in position by means of a U-bolt 24 at each end of the bar 6'. The U-bolts 24 are fastened to a plate 26 under the base of the bar 6' by means of nuts 28. If desired a wider angle bar may be used having its legs resting on the tops of the plates outside of the lugs 8. In this case a longer plate 16 which extends beyond the edges of the base of the bar 6' is used to secure the U-bolts.

Where it is necessary to flame cut a large number of heavy plates or workpieces I have found it desirable to provide protective caps 30 on the rods 18. The caps are made of material which has a higher resistance to the oxidizing effect of the cutting flame than does the steel of which the rods 18 are made so that even though the flame comes through the workpiece after it is cut and impinges on any of the rods 18 the protective caps will prevent the rods from being burned. Various materials may be used for making the caps, e.g. cast iron, oxidation-resistant stainless steels, copper, and copper containing alloys such as Monel metal. All of these materials are characterized by having a higher resistance to the oxidizing effect of the cutting flame than steel.

Where workpieces having one straight edge are to be flame cut I have found it desirable to provide aligned abutments along one side of the cutting table in the form of spaced vertically disposed plates 32 welded to one of the side bars 6.

When the table of the invention is used for manual flames cutting or where it is necessary for the workman to step between the table and the machine when a flame cutting machine is used there is danger from the slag and sparks which fall through the open bottom of the supporting surface of the table. In order to eliminate this hazard I have provided protective spark shielding plates 34 along one side of the table. Pairs of spaced inclined lugs 36 are welded to opposing faces of the webs of the H-beams 4 to form guideways for retaining the plates 34. Positioned in the guideways, the bottom edges of the plates are disposed toward the center of the table and their upper edges are directed away therefrom, as best shown in Figures 7 and 8. The individual plates 34 function to deflect the hot slag and sparks falling from the supporting surface of the table.

While several embodiments of my invention have been shown and described, it will be apparent that other adaptations and modifications may be made without departing from the scope of the following claim.

I claim:

A flame cutting table comprising a base including spaced vertical supports, a horizontally disposed latticework frame supported on said base, said frame including a plurality of elongated bars disposed in spaced parallel relation, a plurality of upright plates extending transversely between adjacent bars in spaced parallel relation, said plates being removably disposed in said frame, and means on said bars for removably retaining said plates, a plurality of vertical sockets mounted in spaced relation on said plates, a plurality of vertically disposed rods each having its lower end removably received in one of said sockets with its other end projecting upwardly of said frame, the upwardly projecting ends of said rods being blunt and terminating in a common horizontal plane above said frame, an elongated inverted V-shaped angle section disposed longitudinally astride one of said bars, said angle section extending along the majority of the length of the bar with the outer edges of the legs of the angle section resting on the plates adjacent the bar, and a plurality of spaced straps disposed peripherally around said angle section and said one of said bars for securing said angle section in position, and means for securing said strap to said one of said bars.

References Cited in the file of this patent
UNITED STATES PATENTS

| | | |
|---|---|---|
| 255,358 | Warth | Mar. 21, 1882 |
| 931,669 | Babcock | Aug. 17, 1909 |
| 1,280,567 | Seibring | Oct. 1, 1918 |
| 1,319,422 | Scharf | Oct. 21, 1919 |
| 1,352,760 | Plumley | Sept. 14, 1920 |
| 1,358,869 | Norris | Nov. 16, 1920 |
| 1,428,872 | Anderson | Sept. 12, 1922 |
| 1,436,560 | Anderson | Nov. 21, 1922 |
| 1,660,327 | Evans | Feb. 28, 1928 |
| 1,750,463 | Deinstein | Mar. 11, 1930 |
| 2,088,695 | Fausek | Aug. 3, 1937 |
| 2,265,287 | Johnson | Dec. 9, 1941 |
| 2,523,343 | Tilli | Sept. 26, 1950 |

FOREIGN PATENTS

| | | |
|---|---|---|
| 294,074 | Switzerland | Oct. 13, 1953 |

OTHER REFERENCES

Oxygen Cutting, E. Seymour Semper, 1949, published by Louis Cassier Company, Ltd., London, England, pages 56, 85–86 cited.

Encyclopaedia Britannica, vol. 9, 1953, page 42.